United States Patent [19]
Jeffrey et al.

[11] 3,709,564
[45] Jan. 9, 1973

[54] COMBINED ELECTRONIC AND FLUID PRESSURE BRAKE APPARATUS

[75] Inventors: William B. Jeffrey, Irwin; Richard K. Frill, Pittsburgh, both of Pa.

[73] Assignee: Westinghouse Air Brake Company, Wilmerding, Pa.

[22] Filed: July 22, 1971

[21] Appl. No.: 165,288

[52] U.S. Cl. ................................. 303/16, 303/22 A
[51] Int. Cl. ................................................. B60t 7/12
[58] Field of Search .................... 303/3, 15–17, 20, 303/22 A

[56] References Cited

UNITED STATES PATENTS

| | | | |
|---|---|---|---|
| 3,443,842 | 5/1969 | Pier | 303/22 A X |
| 3,536,361 | 10/1970 | Engle | 303/16 X |

*Primary Examiner*—Duane A. Reger
*Attorney*—Ralph W. McIntire, Jr.

[57] ABSTRACT

A rapid transit type railway brake control system in which an electronic operating unit is employed to normally regulate electro-pneumatic control of the friction brakes in a manner to continuously supplement the effective dynamic brake sufficient to satisfy the brake demand input. Flow of electric current in a control wire (P-wire) monitored by the electronic control unit is selectively varied to provide the brake demand input to the electronic unit in accordance with operation of a controller device which is adapted to concurrently vary brake pipe pressure in parallel with control wire current. The improvement resides in means for rendering a service brake control valve automatically responsive to variation of brake pipe pressure to provide automatic-pneumatic control of the friction brake consequent to a malfunction rendering the normal electro-pneumatic brake control inoperative.

9 Claims, 4 Drawing Figures

PATENTED JAN 9 1973

| APPL | VALVE 3 | REL VALVE 4 |
|---|---|---|
| APPL. | E. (OPEN) | D(CLOSED) |
| LAP | D(CLOSED) | D(CLOSED) |
| REL. | D(CLOSED) | E.(OPEN) |
| | D(CLOSED) | D(CLOSED) |

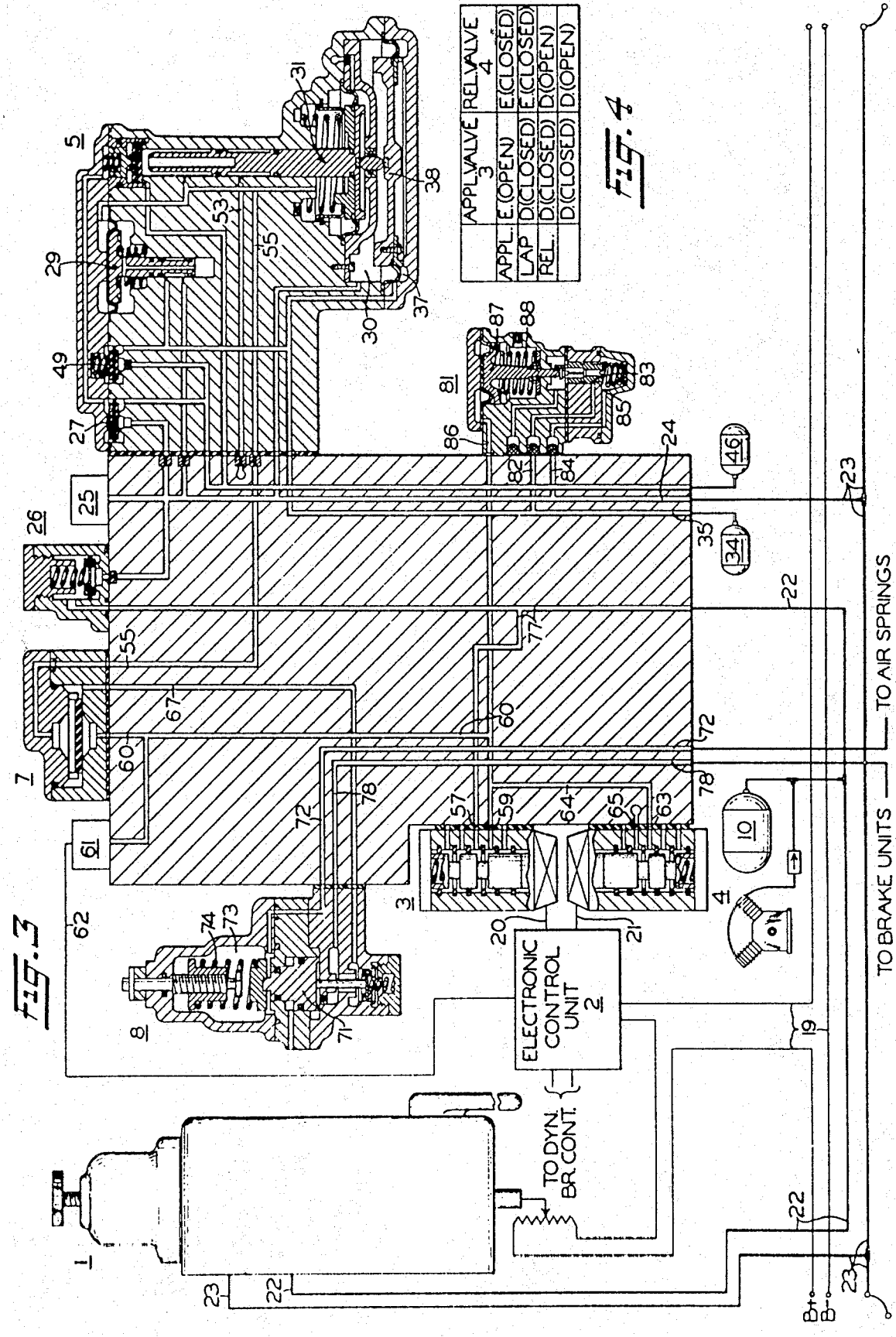

COMBINED ELECTRONIC AND FLUID PRESSURE BRAKE APPARATUS

BACKGROUND OF THE INVENTION

Rapid Transit railroad properties have historically employed the electro-pneumatic concept of brake control to gain near instantaneous brake response on each car, consequently resulting in less interaction between cars. Electro-pneumatic brake control systems have more recently been updated to utilize the solid state electronic technology in order to achieve reliable operation under the extreme conditions existing in railroad operations.

One exemplary system employs an electronic control unit having circuitry for modifying the brake demand signal in accordance with the vehicle load condition and dynamic brake effectiveness for providing a friction brake control signal in response to which pneumatic brake control pressure is developed. A pneumatic to electric transducer senses the effective brake control pressure to provide feedback information to the electronic unit to further modify the load weighed and dynamic brake modified friction brake control signal to provide continuous blending of the combined dynamic and friction braking necessary to satisfy the effective brake demand signal. In the event of a failure in the electronic control unit or the electro-magnetic transducer valve which controls development of pneumatic pressure in accordance with the output from the electronic control unit, an automatic full service brake application is automatically established on each car to bring the train to a halt. A manual changeover valve is provided for converting the brake control system from electro-pneumatic to automatic-pneumatic mode of brake control, in which variation of brake pipe pressure is effective to render the train operative on a "limp-in" basis to return to the station under control of the friction brake.

Since the above-mentioned changeover valve must be repositioned on each car in order to condition the train to proceed in automatic-pneumatic mode of control, a delay is imposed during which time the train is inoperative and consequently in danger of being struck by an approaching train from the rear, especially where tight operating schedules are employed.

SUMMARY OF THE INVENTION

It is, therefore, the main object of the invention to provide a railway vehicle brake system capable of providing an automatic transition of the vehicle brake control from a normal electro-pneumatic mode to automatic-pneumatic mode in response to the electro-pneumatic control malfunctioning.

It is another object of the invention to provide such a brake control system wherein parallel electric and pneumatic brake control signals are generated for control of the respective electro-pneumatic and automatic-pneumatic brake control modes depending upon which mode is controlling.

In accomplishing the above objects, a brake system is provided in which a controller device is selectively operative to different control positions by the operator whereby pneumatic brake pipe pressure is varied in parallel with variation of an electrical signal, such as a commonly employed current analog P-wire signal. A service brake control valve device is subject to operation in response to a pressure differential across its control piston between brake pipe pressure and a control reservoir pressure. During automatic pneumatic mode of control, control reservoir pressure is maintained constant to serve as a reference against which the brake pipe pressure variation is effective to develop graduated service brake pressure by way of a double check valve device. During normal electro-pneumatic mode of control, electro-pneumatic application and release control valves are operative to provide brake pressure by way of the opposite input of the double check valve in response to digital control signals produced by an electronic control unit which is effective to sense the P-wire signal and modify it in accordance with the vehicle load condition, the dynamic brake effectiveness and a pressure feedback signal corresponding to the effective friction brake to produce continuous dynamic/friction brake blending.

As long as the above-mentioned electro-pneumatic brake control is operative, the automatic-pneumatic brake control remains in abeyance pending failure of the electro-pneumatic application valve to respond to a brake application signal from the electronic control unit.

In one embodiment of the invention, the electro-pneumatic application control valve controls fluid pressure communication between the control reservoir and a displacement reservoir to which the control chamber of a conventional relay valve device is connected; and in a second embodiment, the electro-pneumatic application control valve controls fluid pressure communication between a source of supply and the control chamber of a conventional on/off type pilot control valve which in turn controls fluid pressure communication between control reservoir pressure and brake pipe pressure. In each embodiment, control reservoir pressure is dissipated at least to the value of brake pipe pressure in response to operation of the electro-pneumatic application valve to thereby nullify the effect of a brake pipe pressure reduction at the service brake control valve. Control reservoir pressure is prevented from reducing with the brake pipe, however, in consequence of the electro-pneumatic valve failing to respond to a brake application signal for any reason, thereby establishing control reservoir pressure effective to operate the service brake control valve in accordance with reduction of brake pipe pressure thereat to provide a back-up brake application under automatic-pneumatic brake control.

In the first-mentioned embodiment, a load control valve subject to variations in the vehicle load condition controls the level of fluid pressure to which a supply reservoir is charged. This supply pressure is connected to the relay valve, the maximum output of which is thereby limited in accordance with the vehicle load condition. In the latter embodiment, the load control valve supplies brake pressure directly, thus eliminating the need for a separate relay valve device as provided in the first embodiment.

Other objects and attendant advantages of the invention will be understood from the following more detailed explanation when considered with the drawings of which:

FIG. 1 is a diagrammatic view of one embodiment of the invention;

FIG. 2 is a schedule showing the state of energization of the electro-pneumatic application and release control valves of FIG. 1 in the brake application, lap and release conditions;

FIG. 3 is a diagrammatic view of a second embodiment of the invention; and

FIG. 4 is a schedule showing the state of energization of the electro-pneumatic application and release control valves of FIG. 2 in the brake application, lap and release conditions.

Referring now to FIG. 1 of the drawings, a brake control system is shown for each car comprising a rapid transit type train including in general a controller device 1, an electronic control unit 2, electro-magnetic application and release control valves 3 and 4, a pneumatic service brake control valve device 5, a brake cylinder relay valve 6, a double check valve 7, and a pneumatic pressure limiting type load control valve 8.

An air compressor 9 of a type suitable for railway transit type service is provided to charge a main reservoir 10 via a one-way check valve 11 to a desired pressure as determined by the setting of a conventional compressor governor device (not shown).

Comprising controller device 1 is a pneumatic pressure regulator portion 12 comprising a conventional self-lapping type valve assembly which includes a supply valve 13 and an exhaust valve 14. A screw 15 is provided for adjusting the force exerted by a control spring 16 on the control piston of the self-lapping valve assembly in accordance with the position of a handle 17, which acts through a cam shaft to actuate the valve assembly; and an analog current generator portion 18 which includes a suitable rheostat or other means adapted to vary a voltage potential for controlling flow of current in a P-wire 19 in accordance with the selected position of handle 17, the cam shaft of which is effective to operate the rheostat to adjust its electrical resistance in parallel with variation of brake pipe pressure by regulator portion 12. P-wire 19 is a continuous train line loop connected in a conventional manner between adjacent cars in the train by way of the electronic control unit 2 thereon.

The electronic control unit 2 may be similar to the type described in U. S. Pat. No. 3,490,814, issued Jan. 20, 1970, and commonly assigned herewith to Westinghouse Air Brake Company, entitled "Electrically Controlled Fluid Braking System for Rapid Transit Cars." Since a detailed explanation of the electronic control unit 2 is covered in the above-mentioned patent, only the following brief description is deemed necessary for a full understanding of the present invention.

P-wire 19 is connected in series to the control winding of a magnetic amplifier which monitors P-wire current. The output of the magnetic amplifier is conditioned by a chopper driver and power amplifier to produce a uniform square wave signal having an amplitude proportional to current in P-wire 19, being connected to a brake transfer relay and via a contact thereof to a control capacitor via a rate charging resistor. As long as "P-wire" current varies within a preselected range, the control capacitor remains connected to the magnetic amplifier to vary a brake control signal between zero and a preselected maximum voltage potential. When P-wire current exceeds a value defining the upper limit of the preselected braking range, however, the brake transfer relay is effective to transfer the control capacitor to a constant voltage source to maintain the control capacitor charged to a voltage level corresponding to full brake release, with P-wire current being effective to establish propulsion control of the vehicle.

The voltage level to which the control capacitor is charged provides a brake demand signal which is modified by the vehicle load for controlling dynamic braking on the vehicle. A feedback signal representing the degree of dynamic brake effectiveness is compared with the brake demand signal for providing a friction brake control signal in accordance with the difference therebetween. A further feedback signal of the pneumatic brake pressure controlling the magnitude of friction brake effort is compared to the friction brake control signal to provide an error signal by which the friction brake effort is regulated to supplement the dynamic brake and provide continuous blending therebetween. Additional auxiliary control circuits may be utilized to further modify the friction brake control signal to reflect inshot and/or snowbrake control, if desired.

The error signal is finally sensed by analog to digital driver circuitry which provides digital output signals at application and release wires 20 and 21 of electronic control unit 2.

Wire 20 is connected to the solenoid winding of application control valve 3 which includes a spring returned, pilot operated, two-way pneumatic valve portion arranged in a normally closed configuration. Wire 21 is likewise connected to the solenoid winding of release control valve 4 which includes a pneumatic valve portion arranged similar to valve 3.

In charging position of controller handle 17 corresponding to full brake release condition, the self-lapping valve assembly of regulator portion 12 is forced to its one extreme position in which exhaust valve 14 is seated, supply valve 13 is unseated, and control spring 16 is compressed an amount dependent upon the adjustment thereof by screw 15. Fluid pressure effective in main reservoir 10 is connected by way of pipe 22 and the open supply valve 13 to the control piston of the self-lapping valve assembly of portion 12 and to a brake pipe 23 which may be connected in a suitable manner to the brake pipe on adjoining cars to provide a continuous train line brake pipe. Brake pipe pressure is developed until the opposing force of control spring 16 is balanced sufficiently to establish a lap condition of the self-lapping valve assembly and brake pipe pressure is maintained at a value corresponding to the desired "running pressure" of the train as long as handle 17 remains in brake release position.

As brake pipe pressure is charged, fluid pressure therein is connected via passage 24 to a pressure switch 25 and an "air borrowing" check valve 26; also to a supply reservoir check valve 27, a port 28 of a charging valve 29, and a control chamber 30 of a service valve 31. Check valve 26 provides for charging main reservoir 10 by way of brake pipe passage 24 and a passage 22a to passage 22 from the brake pipe 23 of an adjoining car in parallel with charging by compressor 9 to assure main reservoir pressure in the event compressor 9 fails.

A bias spring urges charging valve 29 to a position in which an annular cavity surrounding the valve stem of a control piston 32 comprising charging valve 29 connects port 28 to a port 33, thereby communicating fluid pressure in passage 24 to a control reservoir 34 by way of a passage 35. A branch passage 36 connects control reservoir pressure from the control reservoir and passage 35 to a chamber 37 of service valve 31, which is provided with a differential control piston 38 subject on opposite sides to control reservoir pressure effective in chamber 37 and brake pipe pressure effective in chamber 30. Service valve 31 is further provided with a compensating piston abutment 39 which cooperates with the valve body to form a chamber 40 in which is disposed a bias spring 41. A pusher pin 42 is disposed between pistons 38 and 39 which are supported by spring 41 in a release position during charging. Piston abutment 39 is further provided with a valve stem terminating in an annular exhaust valve seat 43 which in release position is removed from a valve element 44 which is biased into engagement with an annular supply valve seat 45 surrounding seat 43.

Brake pipe pressure in passage 24 is effective to lift supply reservoir check valve 27 and flow to a supply reservoir 46 by way of a passage 47. A branch passage 48 connects supply reservoir pressure from passage 47 to the under side of a control reservoir check valve 49, the upper side of which is subject to control reservoir pressure by way of a branch passage 50. Supply reservoir pressure is also connected by way of a branch passage 51 to the area surrounding supply valve seat 45 where it is cut off by engagement of valve element 44 therewith.

The stem of service valve piston abutment 39 is provided with an opening 52 having communication with an exhaust passage 53 by way of an annular groove 54 surrounding the piston stem. A brake cylinder pilot control delivery passage 55 connects one side of double check valve 7 to compensating chamber 40, to the control piston 32 of charging valve 29, to a port 56 opening into the bore in which the service valve piston abutment 39 operates, and thence to atmosphere via the unseated exhaust valve, opening 52, annular groove 54 and exhaust passage 53.

Application control valve 3 is provided with a port 57 which is connected by way of a branch passage 58 and passage 35 to control reservoir 34; and also a port 59 which is connected by way of a passage 60 to an inlet of double check valve 7 opposite the inlet to which delivery passage 55 is connected and to a pressure to electric transducer 61. A wire 62 connects the transducer to electronic control unit 2 to provide feedback information corresponding to the degree of fluid pressure effective in passage 60 due to electro-pneumatic mode of operation. Release control valve 4 is provided with a port 63 connected by a branch passage 64 to passage 60 and a port 65 connected to atmosphere.

With the controller handle 17 in brake release position, the rheostat of current generator portion 18 is effective to establish P-wire current corresponding to full brake release. If any pressure is detected in passage 60 by transducer 61, the electronic control unit will energize release wire 21 and valve 4, thereby positioning the release control valve 4 to communicate port 63 and passage 60. Fluid pressure in passage 60 is thus vented to atmosphere via port 65 until full release of pressure is accomplished to permit the electronic control unit to assume its lap condition in which valves 3 and 4 are each deenergized, closing off their respective port communications to prevent supply and exhaust of fluid pressure to or from passage 60. The several states of energization controlling application and release control valves 3 and 4 necessary to provide application, lap and release control of electro-pneumatic brake pressure effective in passage 60 is represented in the table of FIG. 2. In lap condition, both the application valve 3 and release valve 4 are indicated as being deenergized to a closed condition.

With the controller handle in release position, it is now seen that passage 55 at double check valve 7 is vented at service valve 31, which is maintained in release position by spring 41, and that passage 60 at double check valve 7 is vented under electro-pneumatic control by electro-magnetic release valve 4. Consequently, a displacement volume 66 is also vented of fluid pressure by way of a passage 67 leading to the outlet of double check valve 7.

Relay valve 6 is of a construction similar to that of service valve 31 except for the absence of the differential control piston thereof. A control chamber 68 of relay valve 6 is communicated with displacement volume 66 via passage 67 and a branch passage 69 and is consequently vented. Relay valve 6 accordingly assumes a release position in which a passage 70 leading to the vehicle brake units (not shown) is connected to atmosphere at the relay valve exhaust port to release the pneumatic brakes.

Load control valve 8 is a conventional pressure limiting type valve comprised of a differential piston 71 subject on one side to air spring pressure connected by way of a passage 72 to a chamber 73 in which is disposed a control spring 74 subject to adjustment by a screw 75 to thereby exert a preselected force on piston 71, causing a valve stem associated therewith to engage a valve element 76 and lift it from its seat. Main reservoir pressure is connected via pipe 22 and a passage 77, past unseated valve 76 to piston 71 where it is effective in opposition to spring 74 and air spring pressure, and thence to a passage 78 leading to a supply reservoir 79 when supply reservoir pressure builds up sufficiently to counteract the preadjusted value of spring 74 and the effective air spring pressure on piston 71, valve 76 is closed to terminate further delivery of fluid pressure to supply reservoir 79, which fluid pressure is limited in accordance with the effective vehicle load condition. A branch passage 80 connects this supply reservoir pressure to the area surrounding the seated relay valve supply valve to provide a source of supply pressure the maximum value of which is limited in accordance with the vehicle load condition.

With the system thus charged and brake pressure fully released, as above explained, a brake application may be effected by movement of the controller handle 17 out of release position into the zone of application an amount depending upon the degree of retardation desired. The rheostat of current generator portion 18 and the self-lapping unit comprising pneumatic regulator portion 12 of controller 1 are thus effective in accordance with the selected handle position to provide proportionally corresponding levels of P-wire current and brake pipe pressure, respectively.

Assuming the level of dynamic brake is insufficient to satisfy the load weighed control signal corresponding to the P-wire signal, application wire 20 and electro-magnetic valve 3 are energized while release wire 21 and electro-magnetic valve 4 remain deenergized. As can be seen in FIG. 2, this condition of valves 3 and 4 corresponds to a brake application under electro-pneumatic mode of control. In the energized state, application valve 3 is positioned to establish fluid pressure communication between ports 57 and 59 thereof, thus tending to equalize fluid pressure in control reservoir 34 into displacement volume 66 by way of passages 35 and 58, ports 57 and 59, passage 60, double check valve 7, and passage 67. The consequent reduction of control reservoir pressure is effective in chamber 37 of service valve 31 via passage 35 and branch passage 36 sufficient to prevent the concurrent reduction of brake pipe pressure effective in chamber 30 from causing movement of differential control piston 39 out of its release position, in which it is biased by spring 41.

At the same time, the buildup of fluid pressure in displacement volume 66 is effective in control chamber 68 of brake cylinder relay valve 6, which is consequently operated to effect fluid pressure communication between supply reservoir 79 and the vehicle brake units via passages 78 and 80, the open relay valve supply valve, and delivery passage 70. Pneumatic pressure is thus supplied to the vehicle units to produce friction brake effort until the corresponding feedback signal at wire 62 produced by transducer 61 conditions the electronic operating unit to deenergize wire 20 and application valve 3 to terminate any further increase in the relay valve control pressure. As the brake pressure buildup effective at the relay valve self-lapping unit is sufficient to counteract the opposing pressure effective in chamber 68, relay valve 6 assumes a lap condition to terminate any further increase in friction brake effort which, when combined with the effective dynamic brake effort, is sufficient to satisfy the effective level of P-wire current.

Application and release valve 3 and 4 remain deenergized to reestablish lap condition of the brakes, as represented in FIG. 2, until the electronic operating unit again calls for a further electro-pneumatic brake application or brake release due, for example, to either P-wire current or the dynamic brake effectiveness being subsequently varied.

In accordance with a brake release condition, wire 21 and electro-magnetic valve 4 are energized while wire 20 and electro-magnetic valve 3 remain deenergized. This results in valve 4 being positioned to establish fluid pressure communication between displacement volume 66 and atmosphere via passage 67, double check valve 7, passages 60 and 64 and ports 63 and 65 of valve 4. Accordingly, control pressure effective in chamber 68 of relay valve 6 is reduced causing the relay valve to vent the vehicle brake unit pressure to atmosphere via passage 70 and the relay valve exhaust port until the desired degree of brake release is accomplished as evidenced by release wire 21 and valve 4 being deenergized. When the reduction of brake pressure is sufficient to effect a balanced condition of the relay valve self-lapping unit, the relay valve also assumes a lap condition to terminate any further brake pressure reduction.

During this period when brake pressure is being released under electro-pneumatic control the concurrent increase in brake pipe pressure is effective to recharge the control reservoir 34 an amount corresponding to the effective brake pipe pressure via charging valve 31, as previously explained. It will also be noted that during the above-described electro-pneumatic mode of control, any reduction of fluid pressure in the control reservoir 34 is effective above check valve 49. This results in supply reservoir pressure effective under check valve 49 being able to flow therepast at a controlled rate to maintain the control reservoir pressure against leakage. Should auxiliary reservoir pressure be reduced below brake pipe pressure, check valve 27 will accommodate the flow of brake pipe pressure therepast at a controlled rate in an attempt to maintain the auxiliary reservoir pressure.

If the electronic operating unit 2 is rendered inoperative or application valve 3 remains deenergized or stuck in the closed position for any reason at the time handle 17 of controller 1 is moved into the brake application zone to effect corresponding levels of brake pipe pressure and P-wire current, as previously explained, thereby resulting in a malfunction in the electro-pneumatic mode of control, control reservoir pressure at port 57 of valve 3 will remain cut off from port 59 thereof. It will be apparent, therefore, that the control reservoir pressure effective in chamber 37 of service valve 31 will remain at a reference value corresponding to the level of brake pipe pressure at the time of the electro-pneumatic malfunction, and that no further buildup of fluid pressure in control chamber 68 of relay valve 7 will occur in electro-pneumatic mode of control. The effective brake pipe reduction will consequently be effective in chamber 34 of service valve 31, however, to create a pressure differential across differential piston 38 sufficient to raise piston 39 and the self-lapping unit thereof via pusher stem 42 to brake application position in which exhaust valve seat 43 engages valve element 44 which is raised off of supply valve seat 45. Fluid pressure in supply reservoir 46 is thence connected to displacement volume 66 via passage 47, branch passage 51, past valve seat 45, to port 56 and passage 55, double check valve 7, and passage 67. At the same time, this delivery pressure in passage 55 is supplied to service valve chamber 40 where it acts on piston abutment 39 in opposition to the force imposed thereon by pusher stem 42 in accordance with the differential control force on piston 38, and to the face of control piston 32 of charging valve 29 to force the piston downward and interrupt control reservoir charging via ports 28 and 33.

Chamber 68 of relay valve 6 is in turn pressurized in accordance with the level of fluid pressure effective in displacement volume 66 to pilot relay valve 6 to application position. As previously explained, relay valve 6 is thence effective to connect supply reservoir pressure from reservoir 79 to the vehicle brake units via passages 78 and 80, the relay valve supply valve, and passage 70, but under automatic-pneumatic mode of control consistent with the brake pipe pressure reduction effective at service valve 31, as opposed to the normal electro-pneumatic mode of control consistent with P-wire current control by way of electronic control unit 2.

When the fluid pressure buildup in chamber 40 of service valve 31 is sufficient to balance the opposing differential control force on the service valve self-lapping unit, the assembly is moved to lap position in which supply of fluid pressure to relay valve control chamber 68 is terminated to effect lap condition of the brakes.

It will be apparent from the foregoing that brake pressure is normally developed under electro-pneumatic mode of control, and in the event an electrical malfunction occurs, a transition to automatic-pneumatic mode of control results, the latter being effective to further develop brake pressure an amount corresponding to the differential between brake pipe pressure and control reservoir pressure. It will be seen that the total friction and dynamic brake effort thus corresponds to the position of handle 17 of the controller 1 in the zone of application, provided the dynamic brake is not affected by the malfunction. Since the dynamic brake may be providing a good proportion of the total brake effort and may be lost due to a malfunction of the electronic control unit 2, controller 1 may be provided with an overreduction zone into which handle 17 may be moved to obtain a further brake pipe reduction through the self-lapping unit 12, thus increasing the pneumatic brake pressure by further increasing the effective differential across the service valve control piston 38 to supplement the loss of dynamic brake.

In the event brake pipe pressure is completely vented due to an emergency vent valve device (not shown) being operated, or a break in the hose connecting the brake pipe 23 between adjoining cars, or movement of the controller handle 17 completely through the over-reduction zone, pressure switch 25, which normally connects electrical power to the electronic control unit 2, is operated to cut off the source of power and thereby cut out the electro-pneumatic brake control. Consequently, control reservoir pressure is unable to follow brake pipe pressure, and service valve 31 becomes immediately responsive to the reduction of brake pipe pressure effective on one side of differential piston 38 in opposition to the constant reference level of control reservoir pressure on the opposite side to pilot relay valve 6, accordingly.

The pressure to which supply reservoir 79 is charged by load control valve 8 limits the maximum pressure capable of being developed in passage 70 and the brake units by relay valve 6 in accordance with the vehicle load condition to prevent a wheel slide condition at any time, but especially during an emergency application, as just described.

In referring now to the system shown in FIG. 3 of the drawing, it will be noted that reference numerals corresponding to those employed in FIG. 1 are used to describe like parts.

FIG. 3 differs from FIG. 1 in that load control valve 8 is utilized to supply the brake units directly, thereby permitting elimination of relay valve 6, displacement volume 66, and supply reservoir 79 of FIG. 1. This is accomplished by connecting passage 67 from the double check valve 7 to the supply valve of the load control valve 8, the delivery of which is connected by way of passage 78 to the vehicle brake units. As before, air spring pressure is connected to load control valve chamber 73 via passage 72 and is effective on piston 71 in cooperation with the adjusted force exerted by control spring 74 to limit pneumatic brake pressure to a value which reflects the vehicle load condition.

Also, main reservoir pressure is connected via passage 77 to port 57 of application valve 3. A pneumatic operated spring returned on/off type control valve 81 is provided for controlling fluid pressure communication between control reservoir pressure connected via passage 35 and a branch passage 82 to a port 83, and brake pipe pressure connected via passage 24 and a branch passage 84 to a port 85. A control passage 86 of valve 81 connects port 59 of application control valve 3 to control piston 87 by way of passage 60 which also connects port 59 to the one input of double check valve 7.

Finally, release control valve 4 is arranged in a normally open configuration as opposed to the normally closed arrangement of FIG. 1. During normal electro-pneumatic mode of operation, application and release control valves 3 and 4 are effective, in accordance with the schedule of FIG. 4, to control the fluid pressure supplied to the vehicle brake units (not shown). Energization of wire 20 and valve 3 establishes fluid pressure supply between main reservoir pressure at port 57 and port 59 which is connected by way of passage 60, double check valve 7, passage 67, load control valve 8, and passage 78 to the vehicle brake units, which are accordingly pressurized.

Transducer 61 and wire 62 feed back a signal corresponding to the effective brake pressure to the electronic control unit 2, which deenergizes wire 20 and valve 3 to terminate further supply of brake pressure when the desired level is reached.

In providing braking pressure, as above explained, fluid pressure effective in passage 60 is also effective at control valve 81 to force piston 87 to its downwardmost position in which a valve operated by piston 87 is effective to establish fluid pressure communication between ports 83 and 85. Consequently, control reservoir pressure is placed in communication with brake pipe pressure so as to reduce therewith in response to the brake pipe reduction occurring in parallel with P-wire variation to thereby nullify operation of service valve 31 by preventing a pressure differential from developing across control piston 38 thereof.

Deenergization of wire 21 by electronic control unit 2 calling for brake release deenergizes release valve 4, which is accordingly positioned to exhaust brake pressure from the vehicle brake units via passage 78, load control valve 8, passage 67, double check valve 7, passage 60, branch passage 64, and release valve ports 63 and 65 to atmosphere. Again, feedback to the electronic control unit 2 results in the exhaust of brake pressure being terminated at the desired pressure, at which point wire 21 and valve 4 are again energized to restore the electro-pneumatic brake control to lap condition.

In referring to the application and release valve schedule of FIG. 4, it will be seen that in release condition application and release valves 3 and 4 are each deenergized, which corresponds to the condition of valves 3 and 4 in the event of a malfunction of the electronic operating unit or failure of the release valve 4 to close during a brake application. Since passage 60 leading to the control piston 87 of valve 81 is, therefore, exhausted in response to a malfunction occurring, as above explained, piston 87 is moved to its uppermost position, as shown, by a return spring 88 in which position fluid pressure communication between ports 83 and 85 is interrupted. Consequently, control reservoir pressure is prevented from following the brake pipe reduction, being maintained at a reference level to operate service valve 31 which develops brake pressure in passage 55 in accordance with the amount of brake pipe pressure reduction relative thereto in automatic-pneumatic brake control mode of operation.

Restoration of brake pipe pressure is effective in a manner similar to that described with respect to FIG. 1 for releasing the automatic developed brake pressure at the exhaust port of service valve 31.

It will thus be seen that in each embodiment, service valve 31 becomes automatically responsive to brake pipe pressure variation in response to failure of the electro-pneumatic brake control to function to produce brake application pressure at the time a brake application is called for by operation of the vehicle controller 1.

Having now described the invention, what we claim as new and desire to secure by Letters Patent, is:

1. A railway vehicle brake control system comprising:
    a. a controller device including:
        i. regulator means for selectively controlling variation of fluid pressure in a brake pipe, and
        ii. voltage control means for selectively controlling variation of an electrical signal in a control wire,
    b. pneumatic brake control means having a differential control piston defining first and second chambers subject respectively to fluid pressure in said brake pipe and fluid pressure in a control reservoir, and valve means operative in accordance with movement of said piston responsive to a pressure differential being established between said brake pipe and control reservoir pressures to provide a first brake control signal,
    c. electronic brake control means subject to said electrical signal for providing a brake demand signal,
    d. electro-pneumatic valve means operable in response to said brake demand signal for producing a second brake control signal and for concurrently effecting adjustment of fluid pressure in said control reservoir to prevent said pneumatic brake control means from providing said first brake control signal in response to variation of brake pipe pressure,
    e. fluid pressure responsive brake control means, and
    f. a double check valve having first and second inlets subject to said first and second brake control signals, respectively, and an outlet via which the predominant one of said signals is communicated with said brake control means.

2. A brake system, as recited in claim 1, further characterized in that said fluid pressure regulator and said voltage control means are concurrently operative to provide corresponding variation of fluid pressure in said brake pipe and the electrical signal on said control wire.

3. A brake control system, as recited in claim 1, further comprising transducer means for providing a feedback signal to said electronic control unit corresponding to the magnitude of said second brake control signal to condition said electronic control unit to adjust said brake demand signal.

4. A brake control system, as recited in claim 1, further comprising limiting valve means subject to fluid pressure in a control chamber thereof corresponding in magnitude to the vehicle load condition for limiting the maximum level of fluid pressure communicated to said brake control means in accordance with the vehicle load condition.

5. A brake control system, as recited in claim 4, wherein said fluid pressure responsive brake control means includes a relay valve having a control chamber connected to the outlet of said double check valve, a supply port to which fluid pressure derived from said limiting valve means is communicated, and a delivery port communicating said supply port with the vehicle brake units in accordance with the predominant one of said first and second brake control signals.

6. A brake control system, as recited in claim 1, wherein said electro-pneumatic valve means comprises:
    a. an application valve having a first port connected with said second chamber of said pneumatic brake control means and a second port connected with said second inlet of said double check valve, said first and second ports being cut off in a deactuated condition and communicated in an actuated condition, and
    b. a release valve having a first port vented to atmosphere and a second port connected to said second port of said application valve, said first and second ports of said release valve being cut off in a deactuated condition thereof and communicated in an actuated condition.

7. A brake control system, as recited in claim 1, wherein said brake control means includes a limiting valve having a control chamber subject to fluid pressure representative of the vehicle load condition, a supply port connected to the outlet of said double check valve, and a delivery port via which the vehicle brake units are pressurized within a range limited by the vehicle load condition.

8. A brake control system, as recited in claim 1, wherein said electro-pneumatic valve means comprises:
    a. an application valve having a first port connected with a source of fluid pressure and a second port connected with said second inlet of said double check valve, said first and second ports being cut off in a deactuated condition and communicated in an actuated condition,
    b. a release valve having a first port vented to atmosphere and a second port connected to said second port of said application valve, said first and second ports of said release valve being cut off in an actuated condition and communicated in a deactuated condition, and
    c. valve means having a control chamber communicated with said second port of said application valve and said second port of said release valve, and first and second ports connected respectively to said first and second chambers of said pneumatic brake control means, said first and second ports of said valve means being communicated in accordance with pressurization of said control chamber and cut off in accordance with depressurization of said control chamber.

9. A brake control system for a railway train including:
 a. a main reservoir on each car of said train,
 b. a compressor device on at least one of said cars providing a source of fluid pressure for storage in said main reservoir associated with that particular car,
 c. a controller device comprising:
  i. regulator means for selectively controlling fluid pressure communication between either said main reservoir or atmosphere and a continuous brake pipe through each car to vary the fluid pressure therein, and
  ii. voltage control means selectively operative for controlling an electrical signal in a continuous control wire through each car,
 d. a one-way check valve on each car subject opposingly to fluid pressure effective in said main reservoir thereon and said brake pipe, said check valve communicating fluid pressure effective in said brake pipe to said main reservoir as long as the pressure therein is below a value corresponding to fluid pressure effective in said brake pipe,
 e. pneumatic brake control means on each car having a differential control piston defining first and second chambers subject respectively to fluid pressure in said brake pipe and fluid pressure in a control reservoir, and valve means operative in accordance with movement of said piston responsive to a pressure differential being established between said brake pipe and control reservoir pressures to provide a first brake control signal,
 f. electronic brake control means on each car subject to said electrical signal for providing a brake demand signal,
 g. electro-pneumatic valve means on each car operable in response to said brake demand signal for producing a second brake control signal and for concurrently effecting adjustment of fluid pressure in said control reservoir to prevent said pneumatic brake control means from providing said first brake control signal in response to variation of brake pipe pressure,
 h. fluid pressure responsive brake control means on each car, and
 i. a double check valve on each car having first and second inlets subject to said first and second brake control signals, respectively, and an outlet via which the predominant one of said signals is communicated with said brake control means.

* * * * *